United States Patent [19]

Balkwill

[11] Patent Number: 4,532,171
[45] Date of Patent: Jul. 30, 1985

[54] MULTIFIBER DESIGN FOR MICROCHANNEL PLATES

[75] Inventor: John T. Balkwill, San Jose, Calif.

[73] Assignee: Varian Associates, Inc., Palo Alto, Calif.

[21] Appl. No.: 557,814

[22] Filed: Dec. 5, 1983

Related U.S. Application Data

[63] Continuation of Ser. No. 374,535, May 3, 1982, abandoned.

[51] Int. Cl.³ .................. B32B 3/20; B22B 31/00; D02G 3/00
[52] U.S. Cl. .................. 428/188; 428/116; 428/398; 65/13; 65/4.3; 156/296
[58] Field of Search .......... 428/398, 397, 373, 374, 428/116, 118, 188; 65/4 A, 13, 4.21; 156/296

[56] References Cited

U.S. PATENT DOCUMENTS 3,679,384  7/1972  Colson et al. ............ 428/116
3,790,654  2/1974  Bagley .................. 428/116
3,990,874 11/1976  Schulman ............... 65/4.21
4,385,092  5/1983  Singer, Jr. ............. 428/188

Primary Examiner—George F. Lesmes
Assistant Examiner—Beverly K. Johnson
Attorney, Agent, or Firm—Stanley Z. Cole; Keiichi Nishimura

[57] ABSTRACT

Each of the multifibers which are stacked in parallel and compressed together to form a boule during the process of manufacturing microchannel plates is hexagonal in cross-section, and single fibers having thicker channel walls are placed at corners of the hexagon in order to prevent damages to corner fibers which are exposed to the strongest external forces.

4 Claims, 2 Drawing Figures

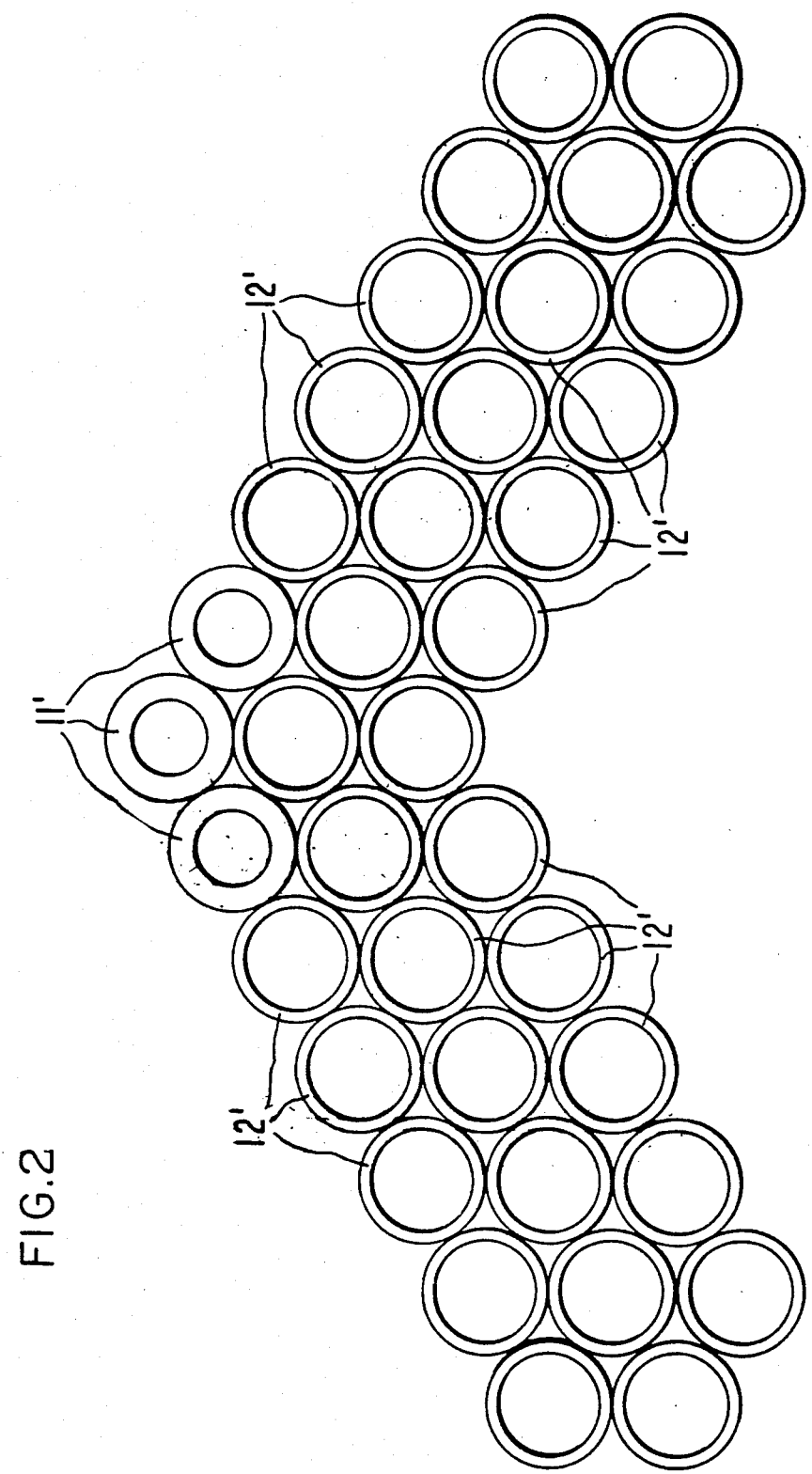

4,532,171

MULTIFIBER DESIGN FOR MICROCHANNEL PLATES

This application is a continuation of application Ser. No. 374,535, filed May 3, 1982, now abandoned.

DESCRIPTION

1. Field of the Invention

This invention relates to microchannel plates and more particularly to a new design according to which glass fibers are assembled to form multifibers constituting the boule from which microchannel plates are produced.

2. Background of the Invention

Fabrication of microchannel plates generally includes the step of stacking a large number of glass fibers in parallel and pulling this assembly longitudinally to reduce its overall thickness. A multifiber thus formed typically contains thousands of tubular single fibers of substantially identical cross-sectional dimensions and a plurality of multifibers are similarly stacked again in parallel and pressed together to produce a boule. A boule is columnar and microchannel plates are obtained by slicing a boule transversely into thin pieces.

For improved image quality of the microchannel plates, it is desirable that single fibers be stacked as compactly and uniformly as possible and this requires not only the single fibers within each multifibers to be uniformly arranged but also all the mutually adjacent multifibers to fit together neatly so as to fill the entire cross-sectional area of the boule continuously. For this reason, it is customary to make multifibers in the shape of a hexagonal column so that they will fit together in a honeycomb-like pattern. For this purpose, it is naturally essential that each multifiber be accurately dimensioned and, in particular, that each corner of the hexagon be exactly angled so as not to leave any void where adjacent multifibers are pressed together.

Forces on sharp corners, however, are necessarily stronger than those on flat surfaces or internal forces. During the course of manufacturing a boule, for example, when the multifibers are assembled and pressed together, single fibers at or near the corners become distorted with very little separation between channels. Thus, small triangular voids are likely to result where corners of three mutually adjacent multifibers should ideally meet at a single point. In a typical situation, such voids are filled in by the fiber cladding glass and the separation between the corner fibers and adjacent fibers tends to be greatly reduced. In fact, five or six fibers with very thin walls are often found at one corner and it is very common to see missing or broken channel walls after the etching process for the manufacturing of microchannel plates. Such defective corners cause dark spots and otherwise adversely affect the quality of the image.

SUMMARY OF THE INVENTION

It is an object of this invention to provide multifibers with a new design from which microchannel plates with improved image quality can be manufactured.

It is another object of this invention to provide a method of preventing broken or missing channel walls in microchannel plates and microchannel plates manufactured by this method.

BRIEF DESCRIPTION OF THE DRAWINGS

FIG. 2 shows a cross-sectional view of a corner section of another multifiber according to a different design embodying the present invention.

DETAILED DESCRIPTION OF THE INVENTION

Figure 1:
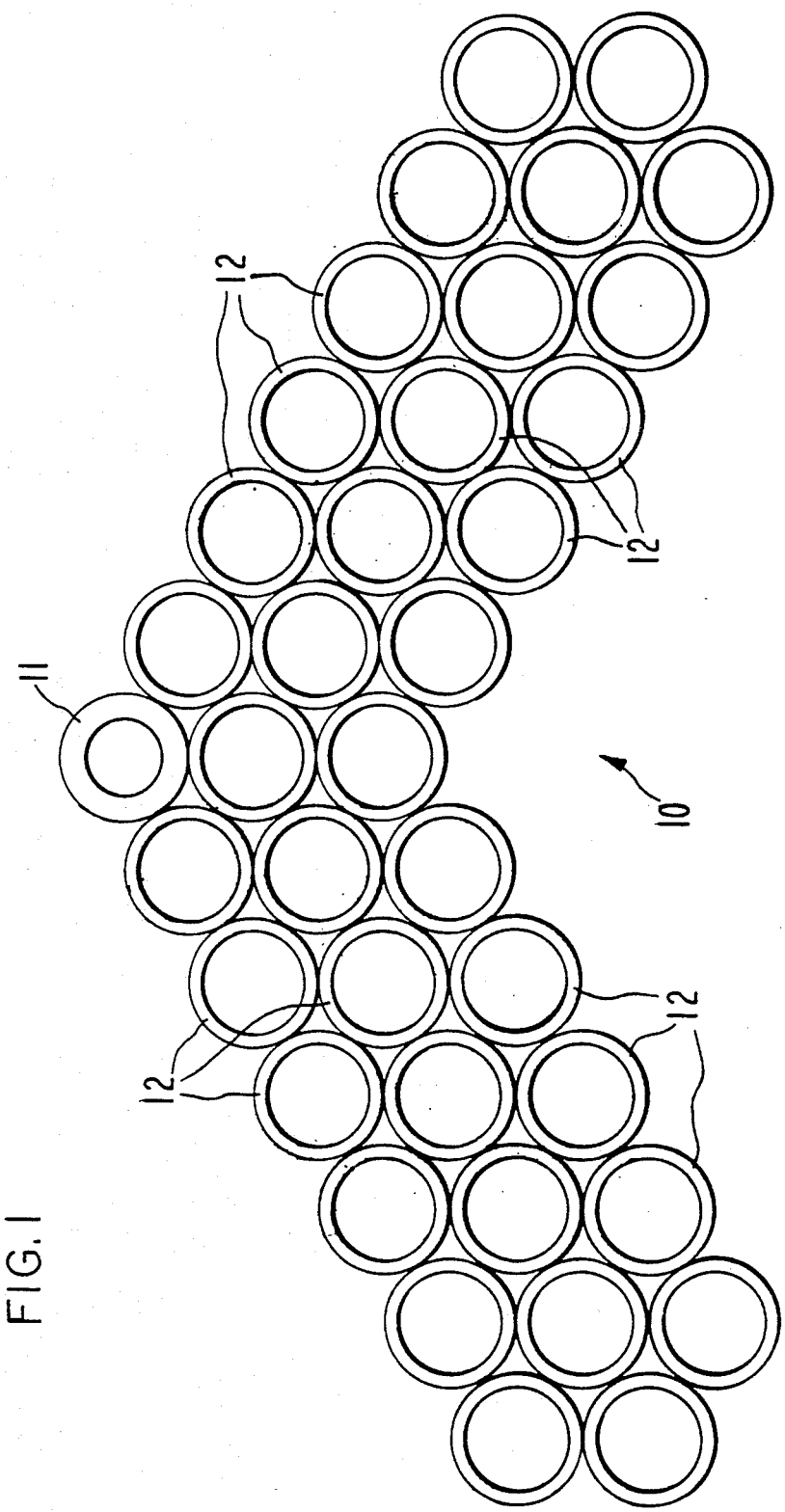
FIG. 1 shows a cross-sectional view of a corner section of a multifiber with a design embodying the present invention.

Described in a most rudimently form, microchannel plates embodying the present invention are produced by slicing a boule transversely into thin pieces, the boule being essentially a parallel assembly of multifibers each of which containing two types of single fibers arranged according to a predetermined design.

These two types of single fibers are of the same outer diameters and a large number of them are stacked compactly together in parallel in such a way that a largest possible number thereof can be found per unit cross-sectional area of the multifiber. Since all single fibers are of the same outer diameter, this means that the centers of their cross-sections form a uniform pattern of equilateral triangles inside each multifiber.

Multifibers are preferably made into the cross-sectional shape of a regular hexagon so that they can fit together without leaving a gap therebetween when stacked together, each set of three mutually adjacent multifibers ideally meeting at a single point (called a multicorner) so that not only will there result a honeycomb-like pattern of multifibers throughout the cross-section of the boule but also the single fibers belonging to different multifibers will describe uniform continuous layers across the multifiber boundaries. Sets of multifibers having other cross-sectional shapes such as equilateral triangles and diamonds can serve the same purpose, but the hexagonal cross-sectional shape is preferable because single fibers at and near sharp corners are easily damaged when multifibers are assembled and pressed together into a boule.

There is no strict limitation as to the number of single fibers stacked together to form a multifiber. If its cross-section is a regular hexagon, each side containing n single fibers, the total number of single fibers contained in such a multifiber will be $N = 3n^2 - 3n + 1$. If n is excessively large or small, efficiency in fabrication and/or the image quality may be adversely affected, and the difficulty of making continuous layers may become severe. N of the order of several thousands or greater is generally preferable.

In one embodiment of the present invention using a total of 2437 single fibers (i.e., n=29) for each multifiber, six of these 2437 single fibers have a considerably smaller channel diameter. This means, since all single fibers have the same outer diameters, that these six single fibers have thicker channel walls and hence are less likely to be broken or otherwise damaged. These special fibers are placed one at each corner of the hexagon where external forces acting on the multifiber are expected to be most strong.

FIG. 1 shows a cross-sectional view of a corner section of a multifiber 10 made according to this embodiment of the present invention. Special fiber 11 and standard fibers 12 having the same outer diameter are compactly stacked together in parallel so that a largest possible number of fibers 11 and 12 will fill a unit cross-sectional area of the multifiber 10. Special and standard fibers are distinguishable in FIG. 1 because standard fibers 12 have a larger channel diameter (or thinner channel walls). According to this embodiment, a special fiber 11 occupies each hexogonal corner of the multifiber, all the remaining fibers being standard fibers 12. In other words, 2431 single fibers of the standard type and six special fibers are used to form a multifiber.

Special and standard fibers 11 and 12 can be made from identical glass tubes. Glass tubes with outer diameter of 1.350 inches and wall thickness 0.15 inches, for example, are drawn to 0.030 inches in outer diameter, a core glass rod of 0.900 inches in diameter being used to produce a standard fiber and a thinner core glass rod of 0.750 inches in diameter for producing a special fiber.

Multifibers, each of the design shown in FIG. 1, are in turn packed tightly against one another in parallel to make a boule so as ideally not to leave any empty space across the boundaries (not shown). This will bring corners of three mutually adjacent multifibers in contact against one another if the multifibers are accurately structured exactly according to the described design. After a plurality of multifibers are thus compactly packed to form a boule, it is sliced transversely into thin pieces by any method known in the art. The microchannel plates thus obtained are funnelled and etched to increase the open area ratio of the plate, and subsequently lacquered and coated with thin layers of other materials such as MgO, SiO and $SiO_2$ to prevent charged particles from flying backwards when the microchannel plate is used, for example, in a photomultiplier tube. Thus, a multichannel plate embodying the present invention has a substantially flat surface composed of hexagonal regions tightly fit together uniformly in a honeycomb-like pattern, each hexagon representing the cross-section of a constituent multifiber having special fibers with thicker channel walls at its corners and standard fibers packing everywhere else tightly in uniform layers.

The special fibers 11 having thicker walls are stronger against external forces and have the effect of increasing the separation between channels. Thus, not only can the channel walls be prevented from breaking when these fibers are packed and pressed into a boule but the corner fibers can also withstand the funnelling and etching more easily.

FIG. 2 shows a cross-sectional view of another embodiment of the present invention which differs from the one described above only in that three, instead of one, special fibers 11' are placed at each of the six corners of the hexagonally structured multifiber. Thus, each multifiber contains 2419 standard fibers 12' and eighteen special fibers 11', if n=29 as before. When such multifibers are similarly assembled and pressed into a boule, nine special fibers are generally found clustered at each multicorner. This embodiment has the advantage of additional strength at the corners where the channel walls are most likely to break. On the other hand, clusters of a larger number of special fibers having a smaller channel diameter tend to adversely affect the visual parameters of the multichannel plate.

In summary, the present invention has been shown above in terms of but a few embodiments. The description, however, is to be considered illustrative rather than limiting. For example, a wide range of numbers can be selected for n defined above. The multifibers need not be hexagonal in cross-section although this is the preferred choice. There are other polygonal shapes which are considered within the purview of the present invention. The cross-sectional dimensions of single fibers can also be freely changed according to the desired effects. Furthermore, although the two types of single fibers were made distinguishable above by their inner diameters, their channels need not be circular in cross-section. It is necessary only that the special fibers have thicker channel walls and hence are stronger than the standard fibers.

In sum, this invention is to be broadly construed, and is limited only by the following claims.

What is claimed is:

1. A microchannel plate having a substantially flat front surface, said plate comprising a plurality of segments compactly packed together, each segment having a polygonal surface which forms a part of said front surface, each segment comprising a plurality of cylindrical hollow glass tubes of a first kind and of a second kind which have thicker channel walls than said tubes of the first kind, said tubes of first and second kinds being of a same outer diameter and said tubes of the first kind being packed compactly together in parallel in a parallel relationship in the direction perpendicular to said polygonal surface, and said tubes of the second kind being at each corner of said polygon.

2. The microchannel palte of claim 1 wherein the number of tubes of the second kind is six.

3. the microchannel plate of claim 1 wherein the number of tubes of the second kind is eighteen and three of said tubes of the second kind are at each corner of said hexagon.

4. The microchannel plate of claim 1 wherein said polygon is a hexagon.

* * * * *